(No Model.)
O. O. OZIAS & E. CANBY.
WEIGHING AND PRICE SCALE.
No. 448,837. Patented Mar. 24, 1891.
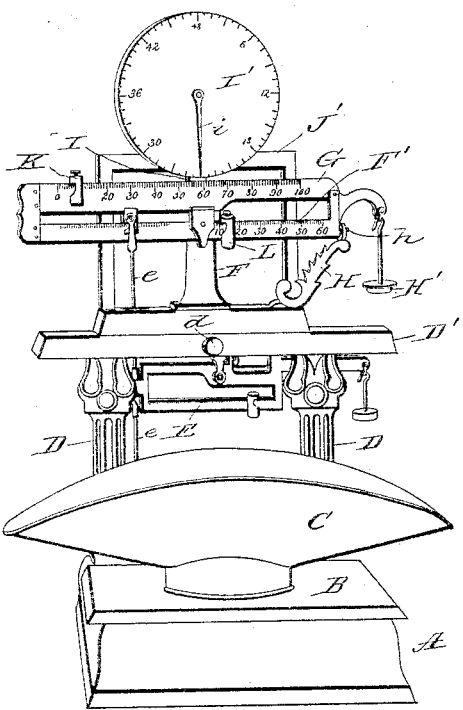
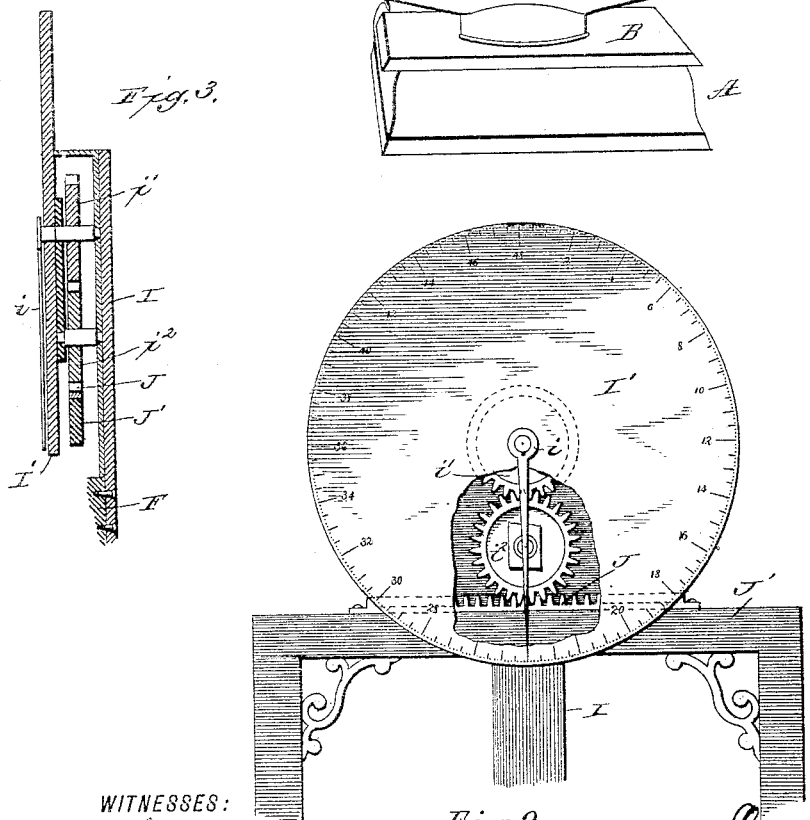
WITNESSES:
INVENTORS
Orange O. Ozias and
Edward Canby,
BY
Church & Church
THEIR ATTORNEYS

UNITED STATES PATENT OFFICE.

ORANGE O. OZIAS AND EDWARD CANBY, OF DAYTON, OHIO.

WEIGHING AND PRICE SCALE.

SPECIFICATION forming part of Letters Patent No. 448,837, dated March 24, 1891.

Application filed November 24, 1890. Serial No. 372,520. (No model.)

*To all whom it may concern:*

Be it known that we, ORANGE O. OZIAS and EDWARD CANBY, of Dayton, in the county of Montgomery and State of Ohio, have invented certain new and useful Improvements in Weighing and Price Scales; and we do hereby declare the following to be a full, clear, and exact description of the same, reference being had to the accompanying drawings, forming a part of this specification, and to the letters of reference marked thereon.

This invention relates to improvements in that class of scales which may be adjusted to indicate the number of pounds, as in the ordinary scale, or the quantity or bulk to be given for a certain sum total, the price of one unit by weight of the quantity or bulk being known, and finally to indicate the price of a given bulk or quantity, the price of one unit of the bulk being known.

The form of scales to which the invention is particularly designed for application is illustrated and described with particularity in the patent to Julius E. Pitrat, No. 385,005, dated June 26, 1888, and to which reference is hereby made for a more complete description of the details of the mechanical parts described in general terms herein.

The invention consists in certain novel details of construction and combinations and arrangement of parts to be hereinafter described, and pointed out in the appended claims, whereby the price per unit of the bulk may be more easily determined and divided into fractional parts of the currency unit in the form shown, it being practical to set the price per unit of bulk to within a quarter or eighth of a cent, enabling, for example, the exact quantity of sugar at any fractional price— say six and three-eighths cents per pound— to be determined, which should be given for a lump sum—say ninety-six cents.

Referring to the accompanying drawings, Figure 1 is a perspective view of a price and weighing scale constructed in accordance with the Pitrat invention and having our present invention applied thereto. Fig. 2 is a front elevation of the dial indicating the units of price and fractions thereof, portions being broken away to show the pointer or indicator operating mechanism. Fig. 3 is a vertical section through the center of the dial, showing its connection with the standard.

Like letters of reference in the several figures indicate the same parts.

A indicates the base of the scale containing the balance-levers which carry the movable platform B, and, when desired, the scoop C.

D are the standards which support the scale-beams and their operating mechanism, to be now described. At the top of the standards D is mounted a rigid supplemental base D', below which is suspended in any usual manner the scale-beam E, connected to the upright rod $e$ and adapted to indicate the weight of merchandise placed on the platform in pounds. The upright rod $e$, it will be understood, forms the connecting-link between the platform-supporting levers and the scale-beams, the connection between the beam E and rod being a loose one of ordinary construction.

On top of the supplemental base D' is mounted to slide longitudinally a frame F, the movement being imparted thereto, as in the Pitrat device, by a hand-wheel $d$ and rack and pinion, and at substantially the center of this movable frame F is mounted the price-scale-beam standard F', having suitable knife-edge pivots at the top for co-operation with the price-scale G in a well-understood manner. As thus constructed, it will be seen that the price-scale beam and its fulcrum and support are longitudinally movable, and the rod $e$, extending through the supplemental base and frame F, occupies a fixed position with relation thereto, and its upper end is adapted to engage the price-scale beam at different points determined entirely by the longitudinal position of the said beam. The means for preventing the horizontal movement of the rod may be the same as in the said Pitrat device, if desired; or the aperture in the base may be of such size as to prevent said movement, the latter construction being contemplated in the drawings. The vertical movement of the said beam G is regulated by the stop-arm and pin H $h$, respectively, at the right-hand end, and at this end of the beam is also connected a pendant H' for the reception of additional price-weights.

Above the price-scale beam and supported in any suitable manner, as by a standard I, is a dial I', having a scale arranged around its periphery and divided into the units and fractions of units of the price per given unit of the quantity as the cents and fractions thereof per pound. At the center of the dial is journaled a revolving pointer or indicator $i$, connected to suitable gear-wheels $i'$ $i^2$ and moved by rack-bar J on a frame J', extending up from and rigidly connected to the movable frame F. The dial-scale and pointer, it will now be seen, indicate the movement of the scale-beam and frame F, and therefore the relative positions of the fulcrum of the scale-beam and the point where the power is applied through the rod $e$, by the changing of which points, it will be understood, the resistance or power of the weights applied to said beam in opposition to the power transmitted through the rod $e$ may be varied, enabling the quantity given for the units represented by said weights to be varied, and the gear-wheels, rack-bar, and pointer are preferably arranged to multiply the movement of the scale-beam, thereby enabling smaller fractions of the price-unit to be indicated plainly on the dial.

Sliding on the upper bar of the scale-beam is a weight K, and on the said beam is marked a scale indicating units of price, preferably from one to one hundred, indicating from one cent to one dollar, and the pendant H' is adapted to receive multiples of the highest amount—that is to say, dollar-weights. On the right-hand end of the lower bar of the beam is mounted a tare-weight L, similar to the tare-weight in the Pitrat scale.

The operation will now be readily understood, and is as follows: Assuming that it is desired to obtain merchandise of a certain value—for instance, fifty cents' worth of sugar—which is selling at a certain price per unit of quantity—say six and three-eighths of a cent per pound—the price-beam and frame F are shifted until the pointer $i$ points to six and three-eighths on the dial, when the fulcrum and point of engagement of the rod $e$ will be brought into proper relation to each other to weigh units of quantity to be given for that price and in proportion the amount to be given for one unit of price, (one cent.) The graduations at the top of the price-beam represent multiples of the price-unit, (cents,) and hence it is only necessary to move the weight K along to the fifty-mark and balance the beam by adding the merchandise to the platform to determine exactly the quantity to be given for the sum mentioned, the same being fifty times the unit of price, and the shifting of the beam having determined the quantity to be given in exchange for one unit.

Should it be desired to obtain the price of a given bulk, its total weight not being known, and the price of one unit of weight being known—for instance, a lump of rock-salt to be sold at one cent and one-quarter per pound—the beam is shifted until the pointer indicates one and one-quarter on the dial, the lump of salt is placed on the platform, and the weight K moved along until the beam balances—say at sixty-five—which shows the price of the lump to be sixty-five cents.

If desired, the price-scale may be provided at one point in its face with divisions indicating pounds, and when it is desired to use the scales to weigh pounds and ounces in the ordinary manner it is only necessary to shift the price-beam until the fulcrum and point of engagement of the rod $e$ bear the proper relation to each other, as in the Pitrat device, in which instance the beam below the supplemental base may be dispensed with.

By employing our invention it is at once apparent that the fractional price per unit of weight, no matter how small, may be readily indicated in plain view of the customer, which results could not be accomplished with a practical mechanism employing a straight unit of price-scale, as in the Pitrat device, nor would it be possible in such devices to employ mechanism for multiplying the range of movement of the indicator on the unit price-scale.

It is obvious that well-known mechanical equivalents may be employed in lieu of the rack-bar and gear-wheel herein shown, and therefore we not wish to be limited to this specific mechanism.

Having thus described our invention, what we claim as new is—

1. In a price-scale, the combination, with the platform, connecting-rod, horizontally-movable fulcrum, and price-beam mounted on said fulcrum to move therewith, of the stationary piece dial, rotary pointer, and mechanism for moving said pointer connected to the longitudinally-movable fulcrum, substantially as and for the purpose specified.

2. In a price-scale, the combination, with the platform, connecting-rod, longitudinally-movable fulcrum, and price-beam mounted on said fulcrum to move therewith to vary the distance between the point of engagement of the connecting-rod and fulcrum, of the stationary dial having the units of price and fractions thereof indicated thereon, the pointer, and the rack-bar connected to the fulcrum of the price-beam for moving the pointer, substantially as described.

3. In a price-scale, the combination, with the platform, connecting-rod, longitudinally-movable fulcrum, and price-beam mounted thereon, of the stationary dial having the units of price and fractions thereof marked thereon, the pointer, the rack-bar connected to and movable with the fulcrum, and the gear-wheel interposed between said rack-bar and gear-wheel connected to said pointer, substantially as described.

4. In a price-scale, the combination, with the platform, supplemental base-frame F, movable longitudinally therewith, price-beam fulcruned on said frame, and connecting-rod having an adjustable connection with said beam, of the stationary dial having the units of price and fractions thereof marked thereon, the pointer and gear-wheel connected thereto journaled in the center of said dial, the elevated frame having the rack-bar mounted on the longitudinally-movable frame F, and the gear-wheel interposed between said rack-bar and gear-wheel on the pointer, substantially as described.

ORANGE O. OZIAS.
EDWARD CANBY.

Witnesses:
FRANK L. CANBY,
FERDINAND J. ACH.